United States Patent [19]

Westberg et al.

[11] Patent Number: 4,862,156
[45] Date of Patent: Aug. 29, 1989

[54] VIDEO COMPUTER SYSTEM INCLUDING MULTIPLE GRAPHICS CONTROLLERS AND ASSOCIATED METHOD

[75] Inventors: Thomas E. Westberg, Boston; Christian S. Rode, Brookline; Bruce G. Burns, Belmont, all of Mass.

[73] Assignee: Atari Corporation, Sunnyvale, Calif.

[21] Appl. No.: 612,625

[22] Filed: May 21, 1984

[51] Int. Cl.$^4$ .............................................. G09G 1/00
[52] U.S. Cl. ................................... 340/747; 340/744; 340/745; 364/521
[58] Field of Search ............... 340/744, 745, 747, 750, 340/789, 799; 273/85 G; 364/521; 382/23, 25

[56] References Cited

U.S. PATENT DOCUMENTS

| | | |
|---|---|---|
| 3,967,268 | 6/1976 | Roberts ................................ 340/745 |
| 3,996,584 | 12/1976 | Plager ................................. 340/745 |
| 4,112,422 | 9/1978 | Mayer et al. . |
| 4,116,444 | 9/1978 | Mayer et al. . |
| 4,296,476 | 10/1981 | Mayer et al. . |
| 4,435,779 | 3/1984 | Mayer et al. . |
| 4,471,464 | 9/1984 | Mayer et al. ...................... 340/799 |
| 4,510,568 | 4/1985 | Kishi et al. ........................ 364/521 |

OTHER PUBLICATIONS

*Cryptography*, by Carl H. Meyer and Stephen M. Matyas, pp. 13–112 and 390–396, published by John Wiley & Sons (1982).

Primary Examiner—David K. Moore
Assistant Examiner—Jeffery A. Brier
Attorney, Agent, or Firm—Flehr, Hohbach, Test, Albritton & Herbert

[57] ABSTRACT

A video computer system and methods are disclosed for displaying video graphics on a video display screen. The video computer system employs two alternative video graphics controllers. A first graphics controller is typically one that has been previously available to consumers and which also has a substantial library of graphics programs which are designed to be executed compatibly thereon. The second graphics controller is typically not compatible with the first graphics controller, and accordingly executes a second type of graphics programs which also may not be compatibly executed on the first controller. A select circuit and methods are disclosed which automatically determine the type of graphics program presented to the system, and correspondingly selects the compatible graphics controller to execute the program. A protection circuit and methods are disclosed which authenticate the origin of the presented graphics programs, and which allow only authorized programs to be executed by the correspondingly selected compatible graphics controller.

13 Claims, 3 Drawing Sheets

VIDEO COMPUTER SYSTEM INCLUDING MULTIPLE GRAPHICS CONTROLLERS AND ASSOCIATED METHOD

BACKGROUND OF THE INVENTION

This invention relates generally to video computer systems, and more particularly, to a video computer system which employs at least two alternative video graphics controllers, thereby enabling the video computer system to compatibly execute graphics programs selected from two generally incompatible libraries of programs.

The video computer technology, especially in the video game and home computer industries, has developed rapidly in recent years. As each new video computer system (VSC) is marketed, video software development firms introduce new and improved video software programs which are compatible with the improved VCS. In many cases, the newly released VCS may not be compatible with its predecessor models. As a result, software designed to be executed on one VCS may not be compatibly executed on another. Since the cost to the consumer of software may, over a period of time, far exceed the cost of the computer system, it is desirable to offer consumers an improved VCS which is capable of executing not only the newly developed programs, but also programs selected from a library of previously published programs designed for an earlier model VCS.

For example, an early VCS employed a video graphics controller disclosed in U.S. Pat. No. 4,112,422 to Mayer, et al. (referred to below as the "Mayer '422 Patent"), entitled "Method and Apparatus For Generating Moving Objects On A Video Display Screen," herein incorporated by reference. The heart of the Mayer '422 Patent is a video graphics controller which is known in the industry as the Television Interface Adaptor, or "TIA" for short. The TIA was an immediate market success and was the subject of two trade articles: *Design Case History: The Atari Video Computer System* (Perry and Wallich, IEEE Spectrum, March 1983), and *Video Games Enter Technology Time Warp* (Brody, High Technology, June 1983). Many software development firms introduced video programs to be compatibly executed on the Artari TIA, with the result that a library presently exists comprising literally hundreds of programs compatibly designed solely for the Atari TIA.

As technological advances made apparent the limits of the Atari TIA, advanced programming techniques and/or a new VCS employing an improved graphics controller were needed in order to satisfy consumer needs for more complex graphic displays. One such advanced programming technique for the Atari TIA is disclosed in a co-pending application, Ser. No. 533,863, filed on Sept. 20, 1983, entitled "A Process For Displaying A Plurality Of Objects On A Video Display Screen," and assigned to the present assignee. An improved VCS and video graphics controller are disclosed in U.S. Pat. Nos. 4,296,476 and 4,435,779 to Mayer, et al. (referred to below as the "Mayer '476 Patent" and "Mayer '779 Patent") entitled "Data Processing System With Programmable Graphics Generator," herein incorporated by reference. The VCS and video graphics controller disclosed in the Mayer '476 and '779 Patents employ many of the basic concepts taught in the earlier Mayer '422 Patent. For example, the Mayer '476 and '779 Patents teach the use of player and missile graphic registers to generate video graphics. Unlike the earlier Mayer '422 patent, however, the Mayer '476 and '779 Patents do disclose the use of both direct memory access (DMA) techniques and display lists to point to graphics data stored in memory.

While the later Mayer '476 and '779 Patents represented advances over prior art, the VCS and video graphics controller disclosed therein were not capable of compatibly executing graphics programs designed for the earlier model VCS which employed the TIA disclosed in the Mayer '422 Patent. In order to overcome this drawback, consumers were given the option of buying a peripheral adapter board which interfaced with the VCS disclosed in the Mayer '476 and '779 Patents, and which enabled the less sophisticated, but large, library of programs compatible with the earlier VCS to be executed thereon. The peripheral adapter board comprised a complete VCS with the TIA as disclosed in the Mayer '422 Patent. Since the graphics created by the VCS disclosed in the Mayer '476 and '779 Patents were considered to be only modestly more sophisticated than those created by the VCS and TIA disclosed in the earlier Mayer '422 patent, many consumers were not willing to pay the relatively large sums of money required to buty not the improved VCS, but also the interface adapter which would enable them to make use of an existing library of the video graphics programs designed for the predecessor model graphics controller.

The need existed to provide a video computer system which employs a video graphics controller which enables the display of greatly improved video graphics. In addition, the need exists to provide such a system which is selectively capable of executing video graphics programs from earlier systems without requiring the user to purchase expensive interface adapters.

SUMMARY OF THE INVENTION

It is an object of the invention to provide an improved dual-mode video computer system which is capable of executing at least two different types of graphics programs designed for at least two different graphics controllers.

It is another object of the invention to provide such a video computer system which is capable of automatically identifying the type of graphics program presented to the system and which correspondingly selects the compatible graphics controller to execute the program.

It is another object of the invention to provide such a computer system which employs at least one video graphics controller which is accompanied by a corresponding large library of compatible programs, and a second improved graphics controller which employs advanced programming techniques dictating that the corresponding graphics programs may not be compatibly executed on the first graphics controller.

It is another object of the invention to provide such a system which authenticates the origin of graphics programs and which prevents unauthorized, or "pirate," programs from being executed by one or both of the graphics controllers.

The above and other objects are achieved by an improved video computer system for displaying video graphics on a display screen. The video computer system includes many standard components, such as microprocessor unit with associated random access (RAM) and read only (ROM) memory, an audio generator, an RF modulator, external controls, and a video display. The video computer system is improved in that it comprises not only a first graphics control circuit for executing a first type of graphics program stored in memory, but also a second graphics control circuit for executing a second type of graphics program which may not be compatibly executed on the first graphics control circuits. A select circuit automatically determines which type of graphics program is stored in memory and initializes the corresponding graphics circuit to compatibly execute the graphics program.

In an alternate embodiment of the invention, the select circuit includes a protection circuit which authenticates the source of the graphics program presented to be executed on the computer system. A latching circuit is responsive to the protection circuit and prevents execution of unauthorized programs. For example, after it is determined that the graphics program is design to be executed on the second graphics control circuit, the protection circuit may use standard encryption techniques to determine whether the graphics program was designed, or written, by an authorized party. If the graphics program was not designed by an authorized party, the protection circuit locks the video computer system in a mode which cannot employ the second graphics control circuit, thereby preventing the compatible execution of the unauthorized program.

Other aspects of the invention will be appreciated by those skilled in the art after a reading of the detailed disclosure of the present invention as set forth below.

DESCRIPTION OF THE DRAWINGS

The novel features of this invention are set forth with particularity below in the claims. The invention, together with its objects and its advantages, are better understood after referring to the following description and accompanying figures. Throughout the figures, the same reference numerals refer to the same elements.

DETAILED DESCRIPTION

Figure 1:
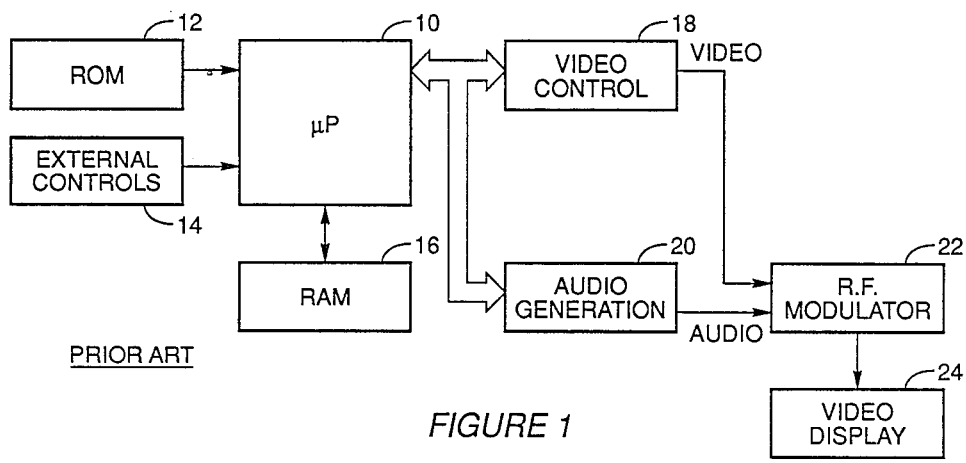
FIG. 1 is a block diagram of a prior art video computer system employing only one video graphics controller.

A typical video computer system (VCS) is shown in FIG. 1. A microprocessor 10 controls a video controller 18. The video controller 18, in combination with a graphics program stored in external memory means 12 determine the parameters of graphics displayed on video display 24. An example of a video computer system may be found in the Mayer '476 Patent, incorporated by reference above. The microprocessor 10 further controls an audio generator 20 which determines the parameters of any audio signals used to produce music and other audio sound effects. A typical audio generator is disclosed in U.S. Pat. No. 4,314,236 to Mayer et al. (referred to below as the "Mayer '236 patent"), hereby incorporated by reference. A RF modulator 22 receives the video signal from the video graphics controller 18 and the audio signal from the audio generator 20 and generates a modulated signal which is transmitted through antenna terminals (not shown) to a video display unit 24. Typically, the video display unit 24 comprises a home television receiver. A read only memory (ROM) 12 stores the graphics program and graphics data, and, in most video computers, comprises a removable cartridge which may be plugged into and removed from a cartridge slot in the computer.

Figure 2:
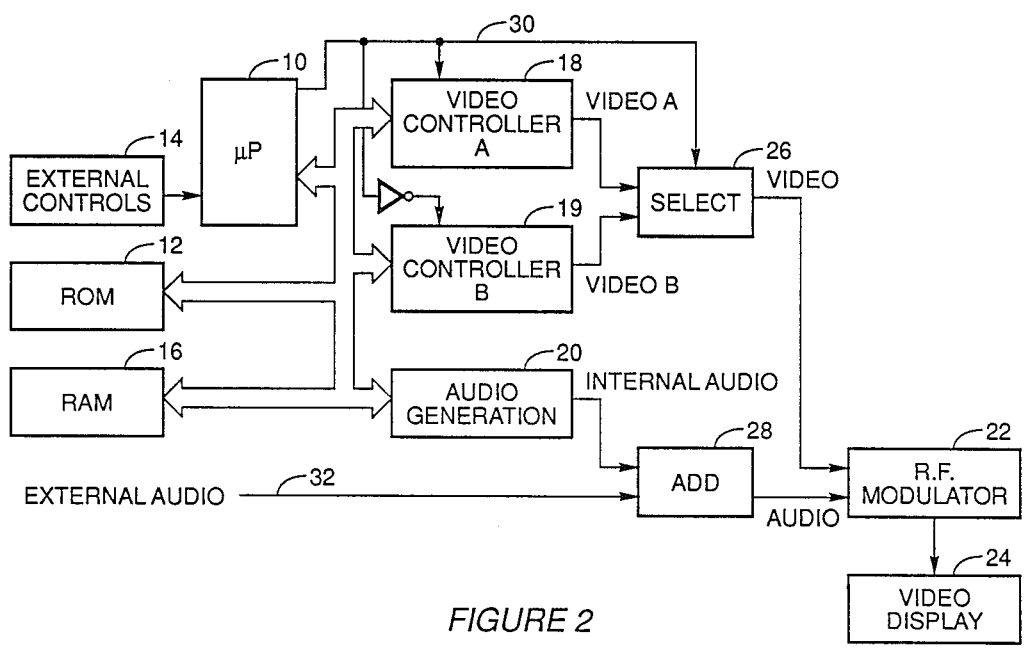
FIG. 2 is a general block diagram of a video computer system employing a plurality of video graphics controllers.

Shown in FIG 2 is an improved VCS which incorporates a first video graphics controller 18, such as the ATari TIA described above and disclosed in the Mayer '422 Patent, and the audio generator 20 as disclosed in the Mayer '236 Patent. In addition the VCS includes a second video graphics controller 19. In many applications, the second video graphics controller 19 is an improved model which executes graphics programs which may not be compatibly executed on the first graphics controller. The microprocessor 10 generates a signal 30 which selects the appropriate graphics controller 18, 19 to compatibly execute the particular type of graphics program presented to the VCS. The signal 30 also instructs select means 26 in order to select the appropriate output from either the first video graphics controller 18 or the second video graphics controller 19 to be input to the RF modulator 22. An external audio signal 32 may be combined at adder 28 to the output from the audio generator 20, to allow improved music and audio sound effects to be provided by an external source.

Before a graphics program stored in ROM 12 and presented to the VCS may be executed, the microprocessor 10 accesses the graphics program stored in ROM 12 and determines whether the program was designed to be compatibly executed by the first video graphics controller 18 or by the second video graphics controller 19. The microprocessor 10 then correspondingly generates signal 30 to select the compatible graphics controller 18, 19 and instructs select means 26 to select the video output of the selected video graphics controller 18, 19. In this manner, the video computer system can compatibly execute programs selected not only from a library written for an existing video graphics controller 18, but also from a library written for a later, improved video graphics controller 19.

Figure 3:
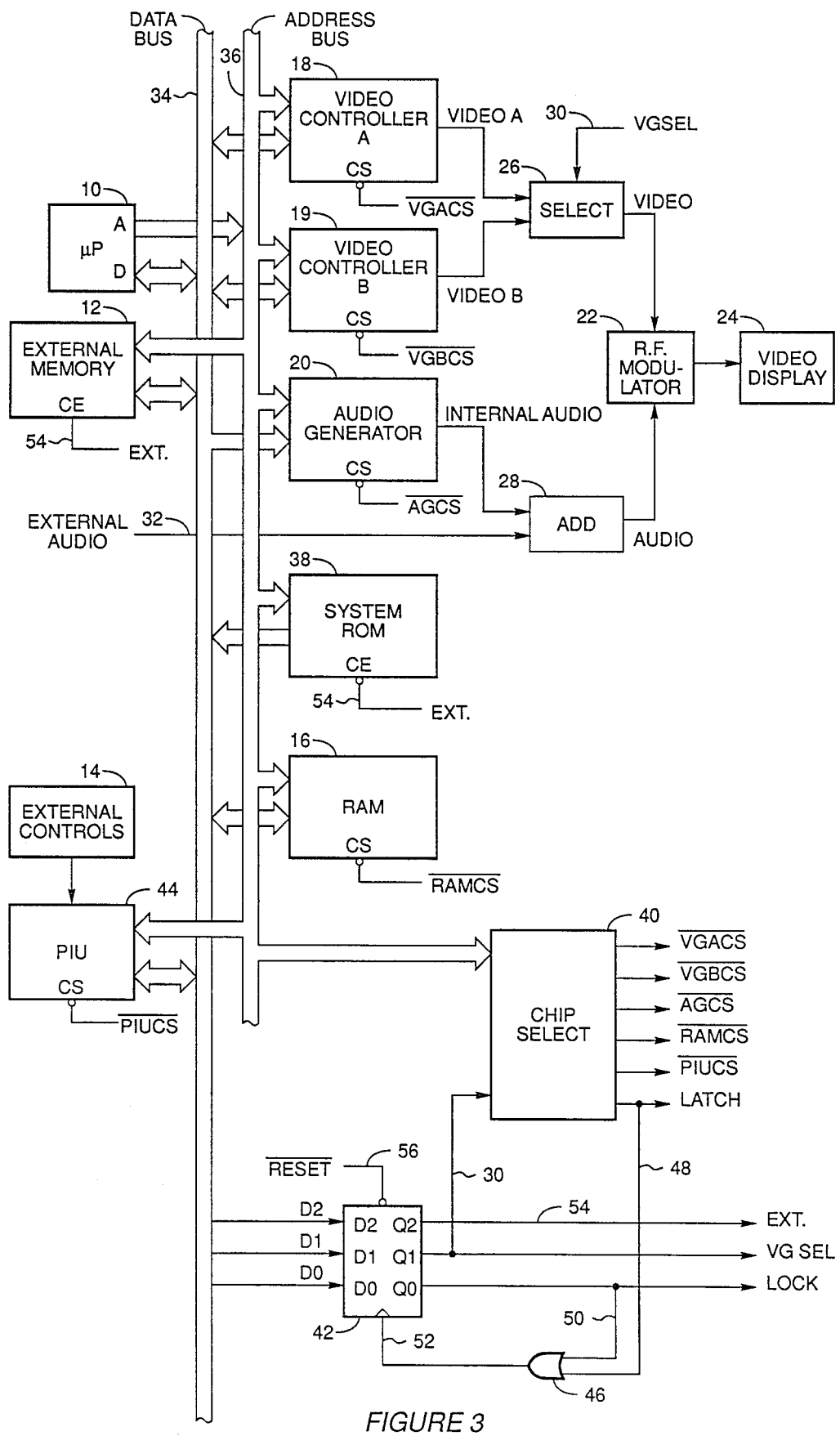
FIG. 3 is a more detailed block diagram of the inventive video computer system employing two video graphics controllers and circuitry to examine a graphics program presented to the system and automatically select the corresponding video graphics controller.

Shown in FIG. 3 is a more detailed block diagram of the video computer system discussed above in reference to FIG. 2. The microprocessor 10 is typically a MOS technology Inc. microprocessor reference by part number MCS6502. The peripheral interface unit 44 (PIU) is typically an input/output circuit manufactured by MOS Technology Inc. and referenced by part number MCS6532. The PIU 44 is used by the microprocessor 10 to scan inputs, such as external controls 14. Additionally, the PIU 44 may be used to output signals to external peripheral devices through the external controls 14. External memory means 12 is typically a ROM containing the graphics program and graphics data. A chip select circuit 40 responds to address bus 36 and control signal VGSEL 30 to generate a plurality of chip selects, signal $\overline{VGACS}$ to the first video gaphics controller 18, signal $\overline{VGBCS}$ to the second video graphics controller 19, signal $\overline{AGCS}$ to the audio generator 20, signal $\overline{RAMCS}$ to the system RAM 16, and signal $\overline{PIUCS}$ to the PIU 44. Chip select circuit 40 also generates a control signal LATCH 48, which is gated through an OR gate 46 with a control signal LOCK 50 to generate a control signal 52. Control signal 52 is used to clock a hex D flip-flop 42 which is typically of the type reference by part number 74LS174. Signal LOCK 50 must be at a low voltage in order to allow LATCH 48 to control the clocking of the flip-flop 42.

The microprocessor 10 may write to the flip-flop 42 by transmitting appropriate data on the data bus 34 and addresses on the address bus 36 such that the chip select circuit 40 causes signal LATCH 48 to switch to a logical high level, enabling signal 52 to clock the data bus 34 into the flip-flop 42. The flip-flop may output control signals EXT 54, VGSEL 30 and LOCK 50. When high, a signal EXT 54 allows the microprocessor 10 to access the grahics program stored in memory means 12. When signal EXT 54 is low the microprocessor 10 may access internal system ROM 38. The select signal VGSEL 30 is used by the microprocessor 10 to select via the select means 26 the video signal from the compatible video graphics controller 18, 19 which is to be transmitted to the RF modulator 22. When high, signal VGSEL 30 causes video output from the first video graphics controller 18 to be transmitted to the RF modulator 22.

Signal VGSEL 30 is used by chip select circuit 40 to determine which of two system address maps is to be used. An address map specifies the addresses at which various system components appear to the microprocessor 10, such as the system RAM 16. In order to compatible execute programs written for an earlier generation VCS, the various systems components must appear at their proper address. However, graphics programs compatibly written for the invention VCS may require the accessing of additional system resources such as additional RAM 16 or the second video graphics controller 19. Such additional system resources should not be visible at all to programs written for a VCS employing the earlier generation video graphics controller. Thus, two different address maps may be used depending on the type of graphics program stored in the memory means 12 and which graphics controller 18, 19 is selected to compatibly execute the program.

As discussed above, it is one object of this invention to automatically determine whether the software program in the cartridge memory 12 was designed for the first video graphics controller 18 or the second video graphics controller 19. It is a further object of this invention to allow only authorized graphics program to be executed on the improved VCS mode.

Figure 4:
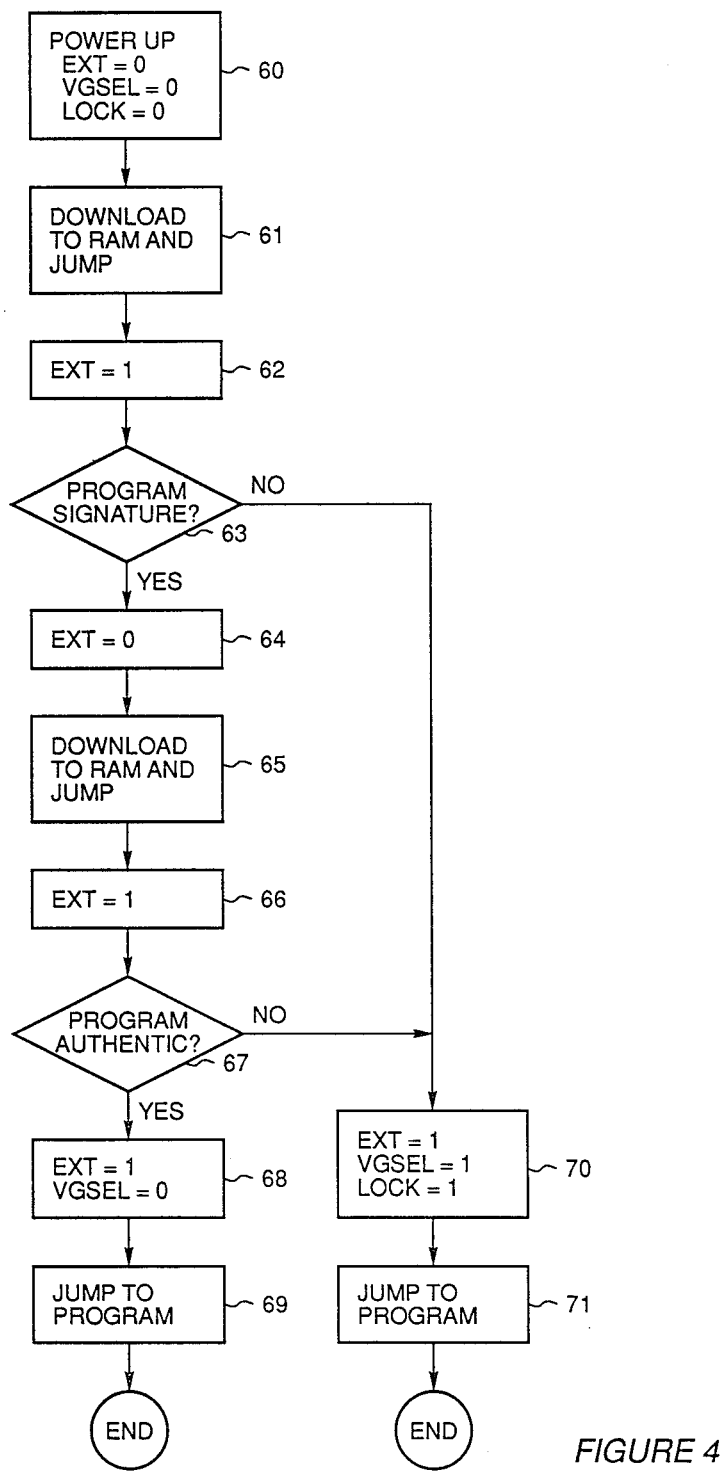
FIG. 4 is a flow chart of an exemplary process for both selecting the appropriate graphics controller and authenticating the origin of the graphics program.

Referring both to FIG. 3 and FIG. 4, a method is disclosed for selecting the appropriate graphics controller 18, 19 and authenticating the origin of the graphics program. When power is first applied to the VCS at 60, signal $\overline{\text{RESET}}$ 56 is held low momentarily. With $\overline{\text{RESET}}$ 56 at a logical low level, flip-flop 42 is cleared. Thus signals EXT 54, VGSEL 30 and LOCK 50 are all at a logical low voltage. Further, the memory means 12 is disabled and the system ROM 38 is enabled, so that the microprocessor 10 will begin executing the program contained in the system ROM 38.

The microprocessor 10 then copies at 61 a portion of the selection program stored in the system ROM 38 into the RAM 16. Program control is then passed from system ROM 38 to the downloaded selection program in RAM 16. The microprocessor 10 then writes at 62 to the flip-flop 42 to cause signal EXT 54 to switch to a high level, allowing the microprocessor 10 to access the external memory 12. In such a configuration, the system ROM 38 cannot be read by the microprocessor 10, however, program control was transferred at 61 to the downloaded program in RAM 16.

The microprocessor 10 then searches at 63 the graphics program stored in memory 12 to attempt to recognize a particular digital signature which represents one of the graphics controllers 18, 19. Such a signature might be a specific bit pattern at a particular address in th program contained in the external memory 12. Depending on the outcome of the search by microprocessor 10, either of two operations may take place. If the digital signature is determined to be indicative of a graphics program designed to be compatibly executed by the first video graphics controller 18, then the microprocessor 10 writes at 70 to flip-flop 42 to cause signals EXT 54, VGSEL 30, to switch to a logical high level. With signal VGSEL 30 at a high level, the VDS operates in a mode employing the first graphics controller 18 to compatibly execute the graphics program. If desired, flip-flop 42 may also cause signal LOCK 50 to switch a logical high level, preventing any further access to flip-flop 42. The microprocessor 10 then transfers program control from RAM 16 to the graphics program in the cartridge memory 12.

In some embodiments, the first graphics controller 18 may be a predecessor model with a large library of existing graphics programs. On the other hand, the second graphics generator 19 may comprise many improvements, including some which may be proprietary. As such, it is desirable to allow only authorized graphics programs to execute on the second graphics controller 19 while allowing all unauthorized graphics programs to be executed on the first graphics controller 18. Such parameters increase the desireability of the dual mode video computer system to consumers who have an existing library of unauthorized graphics programs designed to be executed on the first graphics controller 18.

Additionally, it may not be very prohibitive to rely solely on the recognition of the digital signatures to prevent unauthorized parties from writing graphics programs to be executed on the second graphics controller 19. This is so since it is not difficult to examine a sampling of authorized programs to determine which bits comprise the digital signatures and their corresponding states. Further, it is not unlikely that some authorized graphics programs may, by chance, comprise the proper digital signature. In either situation, it remains advantageous to allow the graphics programs to be executed on the first graphics controller 18, but preclude such programs from being executed on the second graphics controller 19.

Thus, if the digital signature is determined to be indicative of a graphics program designed to be compatibly executed by the second video graphics controller 19, then an authorization process is implemented. The microprocessor 10 writes at 64 to flip-flop 42, causing signal EXT 54 to transgress to a logical low level. Program control is then transferred back to the system ROM 38. A security portion of the program in the system ROM 38 is copied at 65 into the RAM 16, and control of the VCS transferred to the downloaded program in the RAM 16. The microprocessor 10 writes at 66 to flip-flop 42 causing signal EXT 54 to switch to a logical high level.

The microprocessor 10 then searches at 67 the graphics program stored in the memory means 12 to confirm that the program was written by an authorized party.

Any one of a number of encryption techniques could be used to perform operation 67. A plurality of such techniques are discussed in the book *Croptography* written by Meyer and Matyas (John Wiley & Sons, 1982), hereby incorporated by reference.

In the preferred embodiment, a public-key algorithm encryption technique is used. It is well known and a cryptographic algorithm is composed of enciphering (E) and deciphering (D) procedures. Keys selected by the user consist of sequences of numbers or characters. An encirphering key (Ke) is used to encipher plaintext (X) into ciphertext (Y), as in Equation (1), and deciphering key (Kd) is used to decipher ciphertext (Y) into plaintext (X), as in Equation (2).

$$E_{Ke}(X) = Y \tag{1}$$

$$D_{Kd}(E_{Ke}(X)) = D_{Kd}(Y) = X \tag{2}$$

If E and E are made public, as the present discussion assumes, cryptographic security completely depends on protecting the secret keys.

In a public-key algorithm, the enciphering and deciphering keys, Ke and Kd, are unequal. One key is made public and the other key is kept private. However, if the algorithm is to be useful, communicants must be able to compute a public and private pair of keys efficiently, whereas knowledge of the public key alone must not permit the private key to be computed efficiently.

In the preferred embodiment, Kd is made public without compromising the secrecy of Ke. Consequently, the public-key algorithm can be used to obtain digital signatures. The graphics program can be deciphered using the public deciphering key to thereby prove its origin, but only an authorized send can encipher the program through possession of the secret enciphering key.

If the graphics program is determined to be written by an unauthorized party, then the microprocessor writes at 68 to flip-flop 42, causing signal EXT 54 to switch to a logical high level and signal VGSEL 30 to low level, with the same result as discussed above. Namely, the first graphics controller is selected to execute the unauthorized program. The microprocessor 10 then transfer at 69 program control from RAM 16 to the graphics program in the memory means 12. Thus, any unauthorized program will be detected and will be allowed to beexecuted only on the first graphics controller 18. Optionally, the program may generate an alarm signal to either shut the VCS down or select a graphics controller which is not compatible with the detected unauthorized graphics program.

It should be understood that the present invention may be embodied in other specific forms, without departing from its spirit and scope. The present embodiments are to be considered as illustrtive and not restrictive, and the invention is not to be limited to the details herein, but may be modified within the scope of appended claims.

What is claimed:

1. A video computer system for executing graphics programs used to control the display of video graphics, comprising:
    means for storing at least one graphics program;
    first graphics control means for executing graphics programs of a first type;
    second graphics control means for executing graphics programs of a second type;
    means for searching the at least one graphics program for at least one digital signature and for providing at least one first signal to indicate whether the at least one graphics program is of the first or second type; and
    means for receiving the first signal and for selecting between said first and second graphics control means for execution of the at least one graphics program.

2. The system of claim 1 wherein said means for searching includes:
    processor means adapted for implementing the search of the at least one graphics program; and
    means for storing a search program to control said processor means in implementing the search.

3. The system of claim 1 wherein said means for receiving and selecting is adapted for selecting said first graphics control means when the at least one graphics program is of the first type and for selecting said second graphics control means when the at least one graphics program is of the second type.

4. The system of claim 1 wherein said means for searching is adapted for detecting an absence of a digital signature in the at least one graphics program; and
    wherein said means for receiving and selecting is adapted for selecting said first graphics control means is response to a detection of an absence of a digital signature in the at least one graphics program.

5. The system of claim 1 wherein said means for searching is adapted for searching the at least one graphics program for an authorization encryption and for providing at least one second signal to indicate whether the at least one graphics program includes an authorization encryption; and
    wherein said means for receiving and selecting is adapted for receiving the at least one second signal and for selecting said first graphics control means when the at least one graphics program is of the second type and does not include an authorization encryption.

6. A video computer system for executing graphics programs used to control the display of video graphics, comprising:
    means for storing at least one graphics program;
    first graphics control means for executing graphics programs of a first type;
    second graphics control means for executing graphics programs of a second type;
    processor means for implementing a search of the at least one graphics program for at least one digital signature and for providing at least one first signal to indicate whether the at least one graphics program is of the first or second type;
    means for storing a search program to control said processor means in executing the search;
    means for communicating the at least one graphics program and the search program to said processor means; and
    means for receiving the first signal and for selecting said first graphics control means for execution of the at least one graphics program when the at least one graphics program is of the first type and for selecting said second graphics control means for execution of the at least one graphics program when the at least one graphics program is of the second type.

7. The system of claim 6 wherein said means for storing the at least one graphics program comprises a ROM.

8. The system of claim 6 wherein said means for storing a search programcomprises a ROM.

9. The system of claim 6 wherein said means for communicating comprises a data bus and an address bus.

10. A method for providing video signals, the method being implemented using graphics programs presented to a video computer system including processor means, memory means, and first and second graphics controllers, the method comprising the steps of:
providing the processor means with access to the graphics program;
storing a search program in the memory means;
executing the search program on the processor means to cause the processor means to implement a search of the provided graphics program for at least one digital signature to determine whether the provided graphics program is of a first type or a second type;
selecting the first graphics controller when the provided graphics program is of the first type and selecting the second graphics controller when the provided graphics program is of the second type; and
executing the graphics program on the selected graphics controller to cause the graphics controller to provide the video signals.

11. The method of claim 10 wherein said step of executing the search program on the processor means causes the processor means to implement a search of the provided graphics program for an authorization encryption.

12. The method of claim 11 wherein said step of executing the graphics program is implemented only when said step of executing the search program results in the finding of an authorization encryption.

13. The method of claim 11 wherein said step of causing the processor means to implement a search for an authorization encryption is implemented only when the provided graphics program is determined to be of the second type.

* * * * *